United States Patent [19]

Stock

[11] Patent Number: 4,543,873
[45] Date of Patent: Oct. 1, 1985

[54] METHOD AND SYSTEM FOR STORE RACK CARRIAGE

[75] Inventor: William H. Stock, Columbus, Ohio

[73] Assignee: Rockwell International Corporation, El Segundo, Calif.

[21] Appl. No.: 491,157

[22] Filed: May 4, 1983

[51] Int. Cl.⁴ ............................................. F41F 5/02
[52] U.S. Cl. ..................................... 89/1.59; 89/1.54; 244/130
[58] Field of Search ............... 89/1.5 H, 1.5 C, 1.5 R, 89/1 A; 244/130, 127, 137 R; 235/401; 364/423

[56] References Cited

U.S. PATENT DOCUMENTS

| 3,132,561 | 5/1964 | Holland | 89/1.5 |
| 3,427,437 | 2/1969 | Tye | 235/61.5 |
| 3,699,310 | 10/1972 | Cole | 235/61.5 D |
| 3,995,144 | 11/1976 | Johnson et al. | 235/61.5 E |
| 4,246,472 | 1/1981 | Sun et al. | 235/401 |

OTHER PUBLICATIONS

A Store Carriage Airloads Prediction Technique for an F-111 Aircraft Model—D. M. Cahill, (1982).
Epstein, Charles; "Taking the Drag Out of Bombs"; *Flight International;* 8/21/82, pp. 418-420.

*Primary Examiner*—Charles T. Jordan
*Attorney, Agent, or Firm*—Charles T. Silberberg

[57] ABSTRACT

A system and method which allows for the change of pitch angle of a store as required during the mission of an aircraft to minimize the frontal area of the store. By minimizing the drag of the store during the flight, the range of the weapon delivery system can be extended and aircraft handling qualities can be enhanced. The system includes sensing, processing, and positioning means that cooperate to adjust the store position relative to the aircraft.

10 Claims, 1 Drawing Figure

METHOD AND SYSTEM FOR STORE RACK CARRIAGE

BACKGROUND OF THE INVENTION

This invention relates generally to a system and method of adjusting the pitch angle of a store externally mounted on an aircraft during flight of the aircraft as a function of aircraft conditions and flight parameters to minimize the frontal area of the store.

Existing bomb racks are installed in pylons having a fixed angle of attack. The fixed angle will usually align the store into the relative airstream with the airplane for one assumed flight condition.

More recently for high speed airplanes which are highly maneuverable, bombing accuracy has been enhanced with sophisticated mechanisms and systems for bomb ejection. Although such systems necessarily involve some adjustment of the bomb, such positioning occurs as part of the bomb ejection sequence for the purpose of improving bombing accuracy.

The new family of large finned electro-optical and laser guided stores have become very significant weapons for external carriage. These large finned stores present excessive increases in frontal area when not pointed into the air stream. It has been calculated that one laser guided two-thousand pound store presents an increase in frontal area of fifty-four square inches when carried at an angle of three degrees relative to the air stream.

As used herein, a store is a container, a rocket, a bomb, or vehicle carried externally on an aircraft.

SUMMARY OF THE INVENTION

An object of the subject invention is to extend the mission range of the aircraft by minimizing the drag forces on the store throughout the mission.

Another object is to enhance overall airplane performance by minimizing unnecessary drag forces on externally carried stores.

Yet another object is to assist in providing a minimum energy flight path.

Other objects of the invention will become apparent upon reading the following detailed description and upon reference to the drawing.

The present invention includes sensing means for continually detecting flight parameters and airflow conditions (e.g. angle of attack, wind direction, wind speed, aircraft altitude, store drag, Mach number, flight angle, air turbulence, and air density) during cruise. Input signals from the sensors are directed into a processing unit which may be a digital computer, an analog computer, an analog control device, or similar equipment. The processing unit calculates an output signal that is fed either directly or indirectly into control devices that adjust the position of the store to minimize the frontal area exposed to the local air stream. As used herein, frontal area is an equivalent cross-section of the store-fin combination at an angle of attack. By minimizing these drag forces continually during cruise, the overall aircraft and store combination efficiency is enhanced.

Figure 1:
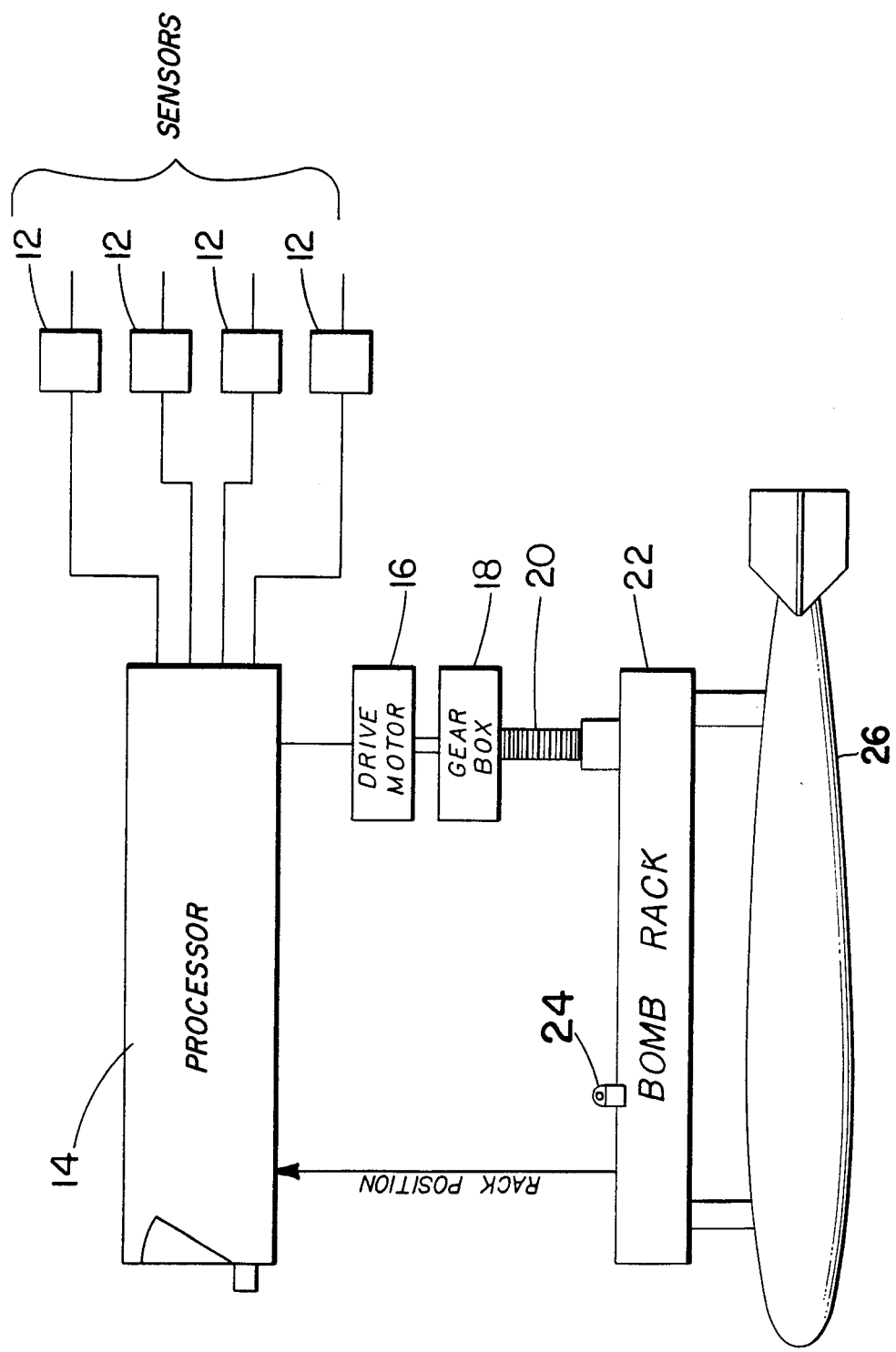
FIG. 1 is a schematic representation of the present invention.

While the invention will be described in connection with the preferred embodiments, it is not intended to limit the invention to those embodiments. Accordingly, it should be clearly understood that the form of the present invention described herein is illustrative only and is not intended to limit the scope of the invention.

DETAILED DESCRIPTION OF THE INVENTION

Referring to FIG. 1, a general schematic is shown of the overall store rack carriage system of the present invention. A plurality of sensors 12 are used to measure selected airflow conditions and flight parameters. The preferred conditions and parameters are angle of attack, altitude and Mach number. These signals are fed into a processor 14 which analyzes these signals and calculates an output signal. The processor 14 may be a digital computer, an analog computer, an analog controller or some similar device. A digital computer is preferred which calculates an output signal at about every two seconds. Also, the components may be electrical, pneumatic, or hydraulic. The output signal is transmitted to a positioning device 16, such as a drive motor, which in turn positions either directly or indirectly, the store 26. Movement of the store 26 is proportional to the output signal computed by the processor 14. As shown in FIG. 1, the positioning is accomplished indirectly. The positioning device 16 translates the processor signal to a mechanical output that drives a gear box 18 and corresponding gear 20 which is attached to a store rack 22. The positioning of the store rack 22 will vary the pitch angle of the store 26. Preferably, the range of position adjustments is about six degrees, since during cruise, only minor adjustments are envisioned. Conceivably, the positioning may also be accomplished by connecting the gear 20 directly to the store 26 to vary the pitch angle.

In the preferred embodiment the store 26 is attached to the store rack 22 which is externally attached to the aircraft (not shown) in two places; a front mounted hinge pin 24 and a rear mounted gear box 18. The hinge pin 24 and the gear box 18 are attached externally to the aircraft. It is also envisioned that the store rack 22 can be movably mounted to the aircraft at two or more points, each of which is positioned based upon calculated signals processed through the processor 14. The processor 14 also can provide the positioning of additional externally mounted stores to maintain the optimum angle of incidence (pitch angle of the store relative to the aircraft) for each store.

As an additional benefit of the system of the present invention, the separation characteristics of the store will be improved because of the minimizing of undesirable aerodynamically induced pitch moments during separation, and the expansion of the weapon delivery envelope.

Accordingly, there has been provided in accordance with the invention, an improved bomb rack carriage system and method for store rack carriage that fully satisfies the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

I claim:

1. A method of minimizing drag forces on an aircraft from an externally mounted store during flight of the aircraft, comprising:
- detecting selected airflow conditions and flight parameters on said aircraft;
- processing said detected airflow conditions and flight parameters to calculate a position of said externally mounted store that minimizes the effective frontal area of said store; and
- positioning said store relative to said aircraft based upon said calculated position.

2. The method of claim 1 wherein said detecting, processing, and positioning steps are performed continually during the aircraft flight prior to store separation such that the store position is modulated as aircraft conditions and flight parameters vary.

3. A system of minimizing drag forces on an aircraft from an externally mounted store during flight, comprising:
- sensing means to detect airflow conditions and flight parameters;
- processing means responsive to said sensing means for generating a position signal representative of a position movement for said store to minimize the effective frontal area of said store, said position signal varying as a function of said sensed airflow conditions and flight parameters; and
- store support responsive to said position signal that modulates said store position relative to said aircraft.

4. The system of claim 3 wherein said processing means continually generates position signals during the aircraft flight prior to store separation as the sensed airflow conditions and flight parameters vary.

5. The system of claim 3 wherein the pitch angle of said store relative to said aircraft is modulated by said store support.

6. The system of claim 4 wherein the pitch angle of said store relative to said aircraft is modulated by said store support.

7. The system of claim 3 wherein said store is modulated through a pitch angle range of about six degrees.

8. The system of claim 3 wherein said airflow conditions and flight parameters are angle of attack, Mach number, and altitude.

9. The system of claim 6 wherein said store is modulated through a pitch angle range of about six degrees.

10. The system of claim 9 wherein said airflow conditions and flight parameters are angle of attack, Mach number, and altitude.

* * * * *